(12) United States Patent
Iwanaga et al.

(10) Patent No.: US 8,119,293 B2
(45) Date of Patent: Feb. 21, 2012

(54) NON-AQUEOUS ELECTROLYTE SECONDARY CELL

(75) Inventors: Masato Iwanaga, Tokushima (JP); Noriko Yamashita, Tokushima (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 0 days.

(21) Appl. No.: 12/710,659

(22) Filed: Feb. 23, 2010

(65) Prior Publication Data

US 2010/0216035 A1 Aug. 26, 2010

(30) Foreign Application Priority Data

Feb. 25, 2009 (JP) ................. 2009-042479

(51) Int. Cl.
*H01M 6/16* (2006.01)

(52) U.S. Cl. ........ 429/327; 429/328; 429/329; 429/338; 429/339; 429/341

(58) Field of Classification Search ........... 429/122–347
See application file for complete search history.

(56) References Cited

U.S. PATENT DOCUMENTS

| 7,622,223 | B2 | 11/2009 | Takahashi et al. |
| 2006/0024584 | A1 | 2/2006 | Kim et al. |
| 2007/0196736 | A1 | 8/2007 | Takahashi et al. |
| 2008/0102369 | A1 | 5/2008 | Sakata et al. |
| 2009/0181311 | A1 | 7/2009 | Iwanaga et al. |

FOREIGN PATENT DOCUMENTS

| JP | 2005-317499 A | 11/2005 |
| JP | 2007-519186 A | 7/2007 |
| JP | 2007-538365 A | 12/2007 |
| JP | 2008-108586 A | 5/2008 |
| WO | 2007/139130 A1 | 12/2007 |

*Primary Examiner* — Basia Ridley
*Assistant Examiner* — Jonathan G Leong
(74) *Attorney, Agent, or Firm* — Westerman, Hattori, Daniels & Adrian, LLP

(57) ABSTRACT

A non-aqueous electrolyte secondary cell can be charged at a high voltage of 4.3V or more and has excellent cycle characteristics and excellent high-temperature storage characteristics. The cell includes positive and negative electrodes capable of inserting and extracting lithium, and a non-aqueous electrolyte. The non-aqueous electrolyte contains a non-aqueous solvent, 1,3-dioxane and a dinitrile compound additives, and an electrolyte salt. The non-aqueous solvent contains ethylene carbonate in the range of 25% to 40% by volume under the conditions of 25° C. and 1 atm.

2 Claims, No Drawings

NON-AQUEOUS ELECTROLYTE SECONDARY CELL

BACKGROUND OF THE INVENTION

1. Field of the Invention

The present invention relates to a non-aqueous electrolyte secondary cell, and more particularly, to a high-voltage charge type non-aqueous electrolyte secondary cell.

2. Background Art

Mobile information terminals such as portable telephones, notebook personal computers, and PDAs are increasingly sophisticated and increasingly reduced in size and weight these days. These terminals use as their driving power sources a variety of non-aqueous electrolyte secondary cells typified by lithium ion secondary cells having a high-energy density and a high capacity. In recent years, these cells are expected to have a higher capacity to meet the demand for higher sophistication of these terminals. One technique known to achieve a higher cell capacity is to improve the utilization of positive electrode active material by charging the positive electrode until the potential of the positive electrode exceeds 4.3V.

As an example of a technique for improving the utilization positive electrode active material, Patent Document 1 below suggests using a positive electrode active material prepared by mixing a lithium cobalt oxide containing a different element and a layered lithium nickel manganese oxide.

In this technique, the lithium cobalt oxide has a different element such as zirconium (Zr) or magnesium (Mg) added thereto to improve its structure stability during charging at a higher potential than a positive electrode potential of 4.3V versus lithium. In addition, the lithium nickel manganese oxide has a layered structure so as to improve its thermal stability in a high potential region. A concurrent use of these two composite oxides improves the stability of a cell during high-voltage charging.

The above-described technique makes the positive electrode active material more resistant to damage during high-voltage charging higher than 4.3V, but has a problem of the oxidative decomposition of an electrolyte on the positive-electrode side during high-voltage charging. This results in a decrease in the high-temperature storage characteristics of the cell.

It is known that high-temperature storage characteristics can be improved by making the ethylene carbonate (EC) content of the non-aqueous solvent of the electrolyte less than 30% by volume, and possibly less than 25% by volume. Ethylene carbonate may cause degradation of electrolytes, and therefore, limiting its content prevents the degradation of the electrolyte so as to improve the high-temperature storage characteristics of the cell.

The ethylene carbonate content of less than 25% by volume, however, causes a problem of deteriorating the cycle characteristics. More specifically, when a non-aqueous electrolyte secondary cell is charged and discharged for several hundred cycles, unfavorable phenomena occur such as a decrease in cell capacity. This means that maintaining excellent cycle characteristics requires an ethylene carbonate content of not less than 25% by volume.

One known technique for improving high-temperature storage characteristics and cycle characteristics without changing the solvent composition is to add an appropriate additive to the electrolyte. Examples of this technique are shown in Patent Documents 2 to 5 below.

Patent Document 2 discloses a technique for improving the storage characteristics at 60° C. of a non-aqueous electrolyte secondary cell that is charged at high voltage by adding 1,3-dioxane to the electrolyte. This technique, however, causes a slight decrease in long-term cycle characteristics.

Patent Document 3 discloses a technique for improving the charge-discharge cycle characteristics of a non-aqueous electrolyte secondary cell and for reducing its swelling during storage by adding a dinitrile compound or the like to the electrolyte. This technique cannot fully improve the long-term cycle characteristics, either.

Patent Document 4 discloses a technique for improving the cell characteristics such as high-temperature cycle characteristics of a non-aqueous electrolyte secondary cell by adding a nitrile group-containing compound and a fluorotoluene compound to the electrolyte.

Additives can not only be added to an electrolyte, but also be mixed with an electrode active material as shown in Patent Document 5 below.

Patent Document 5 discloses a technique for achieving the thermal stability of a non-aqueous electrolyte secondary cell by either applying a nitrile compound such as aliphatic dinitrile to the electrode surface or adding the nitrile compound to the electrode active material. This document states, however, that adding a nitrile compound to an electrolyte increases the viscosity of the electrolyte, thereby decreasing the cell performance.

Patent Document 1: Japanese Patent Unexamined Publication No. 2005-317499
Patent Document 2: WO2007/139130
Patent Document 3: Japanese Patent Unexamined Publication No. 2008-108586
Patent Document 4: Japanese Translation of PCT Publication No. 2007-538365
Patent Document 5: Japanese Translation of PCT Publication No. 2007-519186

SUMMARY OF THE INVENTION

The present invention has an object of providing a non-aqueous electrolyte secondary cell which can be charged at high voltage, prevents a decrease in cycle characteristics by maintaining a constant amount of ethylene carbonate in a non-aqueous solvent, and also has excellent high-temperature storage characteristics.

(1) To achieve the object, the non-aqueous electrolyte secondary cell of the present invention includes:
 a positive electrode having an active material capable of inserting and extracting lithium;
 a negative electrode having an active material capable of inserting and extracting lithium; and
 a non-aqueous electrolyte containing a non-aqueous solvent and an electrolyte salt, the non-aqueous solvent containing ethylene carbonate in the range of 25% to 40% by volume under the conditions of 25° C. and 1 atm, wherein
 the non-aqueous electrolyte further comprises 1,3-dioxane and a dinitrile compound as additives.

As described above, the present invention uses a non-aqueous solvent containing ethylene carbonate in the range of 25% to 40% by volume, and also uses 1,3-dioxane and dinitrile compound as additives to the non-aqueous electrolyte. This structure achieves a non-aqueous electrolyte secondary cell excellent in both cycle characteristics and high-temperature storage characteristics. When the ethylene carbonate content is less than 25% by volume, the cycle characteristics are low, and when the content is over 40% by volume, the electrolytic solution has a high viscosity, thereby deteriorating high-load characteristics, low-temperature discharge performance, and other characteristics.

(2) The non-aqueous electrolyte may further contain, as an additive, vinylene carbonate in the range of 0.5% to 3.0% by mass relative to the total mass thereof.

With this structure, vinylene carbonate forms a protective layer in the negative electrode, and the 1,3-dioxane and the dinitrile compound preferably act on the positive electrode. Their concurrent use synergistically improves the cell characteristics.

(3) The content of the dinitrile compound may be in the range of 0.3% to 3.0% by mass relative to the total mass of the non-aqueous electrolyte.

This is because of the following reason. When the content of the dinitrile compound is less than 0.3% by mass, the effect of its addition is low, and when the content is over 3.0% by mass, the active material protective layer is formed too much, possibly causing a decrease in cycle characteristics.

(4) The content of the 1,3-dioxane may be in the range of 0.3% to 3.0% by mass relative to the total mass of the non-aqueous electrolyte.

This is because of the following reason. When the content of the 1,3-dioxane is less than 0.3% by mass, the effect of its addition is low, and when the content is over 3.0% by mass, both the initial capacity and the cycle characteristics are low.

Note that in the present specification, 1,3-dioxane, dinitrile compound, and vinylene carbonate are treated as additives to the non-aqueous electrolyte, and not treated as ingredients of the non-aqueous solvent.

The term "the total mass of the non-aqueous electrolyte" means the sum of the mass of the non-aqueous electrolyte (non-aqueous solvent+electrolyte salt) and the mass of the 1,3-dioxane, the dinitrile compound, or the vinylene carbonate added thereto.

The terms "% by volume", "volume ratio", and "mol/L" used in this specification are defined based on the volume measured under the conditions of 25° C. and 1 atm.

One example of the dinitrile compound used in the present invention is aliphatic dinitrile. Examples of the aliphatic dinitrile include succinonitrile, glutaronitrile, adiponitrile, pimelonitrile, sebaconitrile, and 1,10-dicyanodecane. These dinitrile compounds may be used in combination of two or more thereof.

Examples of the positive electrode active material used in the present invention include the following (i) to (iv): (i) composite oxides prepared by adding a different element such as zirconium, aluminum, titanium, or magnesium to a lithium cobalt oxide; (ii) materials prepared by mixing the different element-containing lithium cobalt oxide and a layered lithium nickel manganese oxide; (iii) composite salt-coated lithium-cobalt composite oxides prepared by depositing a nickel-manganese-cobalt composite salt on the surface of a core material, and then heating it; and (iv) lithium-cobalt composite oxides prepared by dispersing particles of a compound such as erbium hydroxide or erbium oxyhydroxide to the surface of the core material.

As described hereinbefore, the non-aqueous electrolyte secondary cell of the present invention concurrently uses 1,3-dioxane and a dinitrile compound as additives to the non-aqueous electrolyte during high-voltage charging. The concurrent use has a synergistic effect that cannot be obtained when they are used solely, allowing the cell to provide both excellent cycle characteristics and excellent high-temperature storage characteristics.

DETAILED DESCRIPTION OF THE INVENTION

The present invention will be described as follows based on the examples shown below to which the present invention is not limited, and can be implemented in various forms within its scope.

Example 1

Non-aqueous electrolyte secondary cells of Example 1 were produced as follows.

Preparation of Positive Electrode Active Material

The positive electrode active material of Example 1 is composed of a different element-containing lithium cobalt oxide (active material "A") and a layered lithium nickel manganese oxide (active material "B").

The different element-containing lithium cobalt oxide as the active material "A" was prepared as follows.

Cobalt (Co), 0.15 mol % of zirconium (Zr), and 0.5 mol % of magnesium (Mg) were coprecipitated as hydroxide and subjected to a pyrolysis reaction so as to obtain a tricobalt tetroxide ($CO_3O_4$) containing zirconium and magnesium. The tricobalt tetroxide was mixed with lithium carbonate and heated at 850° C. for 24 hours in air atmosphere. The resultant mixture was pulverized to an average particle size (d50) of 14 μm in a mortar so as to prepare, as the active material "A", the lithium-cobalt composite oxide containing zirconium and magnesium.

The layered lithium nickel manganese oxide as the active material "B" was prepared as follows.

Lithium carbonate ($Li_2CO_3$) was mixed with a coprecipitated hydroxide expressed by $Ni_{0.33}Mn_{0.33}Co_{0.34}(OH)_2$, heated at 1000° C. for 20 hours in air atmosphere, and pulverized to an average particle size (d50) of 5 μm in a mortar. The crystal structure of the active material "B" thus obtained was measured by X-ray diffraction method to confirm that the active material "B" has a layered structure.

Preparation of the Positive Electrode

The active materials "A" and "B" were mixed in a mass ratio of 7:3 to prepare the positive electrode active material used Example 1. Then, 94 parts by mass of the positive electrode active material was mixed with 3 parts by mass of carbon powder as a conductive agent and 3 parts by mass of polyvinylidene fluoride powder as a binder. The resultant mixture was mixed with an N-methylpyrrolidone (NMP) solution so as to prepare a slurry. The slurry was applied to both sides of a 15 μm thick aluminum current collector using a doctor blade method, and dried. As a result, a positive electrode plate was completed which included the positive electrode current collector having an active material layer on both sides thereof. The positive electrode plate was compressed by a compression roller so as to prepare a positive electrode having a short side of 29.0 mm in length.

Preparation of the Negative Electrode

A negative electrode slurry was prepared by dispersing 95 parts by mass of graphite powder as a negative electrode active material, 3 parts by mass of carboxymethylcellulose (CMC) as a viscosity improver, and 2 parts by mass of styrene-butadiene rubber (SBR) as a binder into water. The slurry was applied to both sides of an 8 μm thick copper current collector using a doctor blade method, and dried. As a result, a negative electrode plate was completed which included the negative electrode current collector having an active material layer on both sides thereof. The negative electrode plate was compressed by a compression roller so as to produce a negative electrode having a short side of 31.0 mm in length.

The amounts of the electrode slurries applied were determined so that the charging capacity ratio (the negative electrode charging capacity/the positive electrode charging capacity) could be 1.1 in the region where the positive and negative electrodes faced each other when the completed cell was charged up to a cell voltage of 4.4V (equivalent to a positive-electrode charge potential of 4.5V versus lithium).

Preparation of the Non-Aqueous Electrolyte

The non-aqueous electrolyte of Example 1 was prepared as follows. First, a mixed solvent was prepared by mixing ethylene carbonate, propylene carbonate, methyl ethyl carbonate, and diethyl carbonate in a volume ratio of 30:1:34:35 under the conditions of 25° C. and 1 atm. Then, $LiPF_6$ was dissolved at a concentration of 1.0 M (mol/L) in the mixed solvent so as to prepare an electrolytic solution. Next, the following were added as additives to the electrolytic solution: 1.0% by mass of 1,3-dioxane, 1.0% by mass of a dinitrile compound, and 2.0% by mass of vinylene carbonate. The total mass of the electrolyte, which is the sum of the electrolytic solution and the additives, is defined as 100% by mass.

Assembly of the Cell

The positive and negative electrodes and a separator made of polyethylene microporous film were wound by a winder and pressed to form an electrode assembly. The electrode assembly and the above prepared non-aqueous electrolyte were housed in a prismatic cell can so as to complete the prismatic non-aqueous electrolyte secondary cells of Example 1. Each cell is 4.5 mm in thickness, 34 mm in width, and 43 mm in height, and has a theoretical capacity of 820 mAh.

Example 2

Cells of Example 2 were produced in the same manner as in Example 1 except that the non-aqueous solvent consisted of ethylene carbonate, propylene carbonate, methyl ethyl carbonate, and diethyl carbonate in a volume ratio of 25:1:39:35.

Example 3

Cells of Example 3 were produced in the same manner as in Example 1 except that the non-aqueous solvent consisted of ethylene carbonate, propylene carbonate, methyl ethyl carbonate, and diethyl carbonate in a volume ratio of 25:1:39:35, and that 1.0% by mass of adiponitrile was replaced by 1.0% by mass of sebaconitrile (SN).

Example 4

Cells of Example 4 were produced in the same manner as in Example 1 except that the adiponitrile content was 0.3% by mass.

Example 5

Cells of Example 5 were produced in the same manner as in Example 1 except that the adiponitrile content was 0.1% by mass.

Example 6

Cells of Example 6 were produced in the same manner as in Example 1 except that the 1,3-dioxane content was 0.3% by mass.

Example 7

Cells of Example 7 were produced in the same manner as in Example 1 except that the 1,3-dioxane content was 0.1% by mass.

Example 8

Cells of Example 8 were produced in the same manner as in Example 1 except that the adiponitrile content was 3.0% by mass.

Example 9

Cells of Example 9 were produced in the same manner as in Example 1 except that the adiponitrile content was 4.0% by mass.

Example 10

Cells of Example 10 were produced in the same manner as in Example 1 except that the 1,3-dioxane content was 3.0% by mass.

Example 11

Cells of Example 11 were produced in the same manner as in Example 1 except that the 1,3-dioxane content was 4.0% by mass.

Example 12

Cells of Example 12 were produced in the same manner as in Example 1 except that the non-aqueous solvent consisted of ethylene carbonate, propylene carbonate, methyl ethyl carbonate, and diethyl carbonate in a volume ratio of 25:1:39:35, and that the vinylene carbonate content was 0.2% by mass.

Example 13

Cells of Example 13 were produced in the same manner as in Example 1 except that the vinylene carbonate content was 0.5% by mass.

Example 14

Cells of Example 14 were produced in the same manner as in Example 1 except that the vinylene carbonate content was 3.0% by mass.

Example 15

Cells of Example 15 were produced in the same manner as in Example 1 except that the 1,3-dioxane content was 0.3% by mass, and that the vinylene carbonate content was 5.0% by mass.

Example 16

Cells of Example 16 were produced in the same manner as in Example 1 except for using a positive electrode active material different from that of Examples 1 to 15. The positive electrode active material of Example 16, a lithium-nickel-manganese-cobalt composite oxide, was prepared in Steps (1) to (4) shown below.

Preparation of Positive Electrode Active Material
(1) Production of Core Oxide

A lithium-cobalt composite oxide forming the core member of the positive electrode was produced as follows. First, cobalt carbonate as a cobalt source was heated at 550° C., and then subjected to a pyrolysis reaction so as to obtain cobalt tetroxide. Lithium carbonate as a lithium source and the cobalt tetroxide were weighed in a molar ratio of 1:1, and mixed in a mortar. The resultant mixture was heated at 850° C. for 20 hours in air atmosphere so as to obtain a lithium-cobalt composite oxide. The lithium-cobalt composite oxide was pulverized to an average particle size of 15 μm to obtain the core oxide.

(2) Coating Step

The core oxide thus produced was stirred in pure water. Next, an aqueous solution containing nickel, manganese, and cobalt ions was instilled into the water so as to obtain a composition of $Li_{1.08}Ni_{0.33}Mn_{0.33}Co_{0.34}O_2$. Then, ammonium bicarbonate was instilled thereinto so as to deposit nickel-manganese-cobalt composite salt on the core oxide, thereby forming a coating member. The amount of the coating member was made to be 1 mol % of the core oxide.

(3) Mixing Step

The oxide coated with the coating member by the above step was filtered, washed, heat treated, and mixed with a lithium compound.

(4) Heating Step

The mixture obtained by the mixture step was heated at 900° C. for 24 hours, and pulverized to an average particle size of 15 μm in a mortar so as to obtain the lithium-nickel-manganese-cobalt composite oxide as the positive electrode active material of Example 16.

Production of the Positive Electrode

First, 94 parts by mass of the resulting positive electrode active material was mixed with 3 parts by mass of carbon powder as a conductive agent and 3 parts by mass of polyvinylidene fluoride powder as a binder. The resultant mixture was mixed with an N-methylpyrrolidone (NMP) solution so as to prepare a slurry. The slurry was applied to both sides of a 15 μm thick aluminum current collector using a doctor blade method and dried. As a result, a positive electrode plate was completed which included the positive electrode current collector having an active material layer on both sides thereof. The positive electrode plate was compressed by a compression roller so as to produce a positive electrode having a short side of 29.0 mm in length.

Comparative Example 1

Cells of Comparative Example 1 were produced in the same manner as in Example 1 except that the non-aqueous solvent consisted of ethylene carbonate, propylene carbonate, methyl ethyl carbonate, and diethyl carbonate in a volume ratio of 25:1:39:35, and that no dinitrile compound was added.

Comparative Example 2

Cells of Comparative Example 2 were produced in the same manner as in Example 1 except that neither a dinitrile compound nor 1,3-dioxane was added.

Comparative Example 3

Cells of Comparative Example 3 were produced in the same manner as in Example 1 except that no dinitrile compound was added.

Comparative Example 4

Cells of Comparative Example 4 were produced in the same manner as in Example 1 except that no 1,3-dioxane was added.

Comparative Example 5

Cells of Comparative Example 5 were produced in the same manner as in Example 1 except that the non-aqueous solvent consisted of ethylene carbonate, propylene carbonate, methyl ethyl carbonate, and diethyl carbonate in a volume ratio of 20:1:44:35.

Test and Measurements

The cells of Examples 1 to 16 and Comparative Examples 1 to 5 were subjected to the tests below.

Cycle Characteristics Test

First, the cells were charged at a constant current of 820 mA (1 It) at 25° C. until the voltage reached 4.38V (equivalent to a positive-electrode charge potential of about 4.48V versus lithium). The cells were then further charged at a constant voltage of 4.38V at 25° C. until the current reached 16 mA. Next, the cells were discharged at a constant current of 820 mA at 25° C. until the cell voltage reached 3.0V. A series of charge-discharge operations defined as one cycle were repeated 300 times. The discharge capacity of each cell was measured after the first and 300th cycles, and calculated as the cycle discharge capacity, which is an index of the cycle characteristics. The cycle discharge capacity is calculated based on the calculation formula below:

cycle discharge capacity(%)=(discharge capacity after the 300th cycle/discharge capacity after the first cycle)×100

High-Temperature Storage Test

First, one cycle of the above-described cycle characteristics test was performed at 25° C. as follows. The cells were charged at a constant current of 820 mA and at a constant voltage of 4.38V, and then discharged at the constant current of 820 mA at 25° C. until the cell voltage reached 3.0V. Next, the cells were again charged at the constant current of 820 mA and the constant voltage of 4.38V. The cells thus charged were stored for 20 days at 60° C. After the storage, the cells were charged at the same constant current and the same constant voltage as above, and then discharged at a constant current of 164 mA so as to measure the discharge capacities. Then, the ratio of the discharge capacity to the initial capacity was calculated, and defined as a high-temperature post-storage capacity return rate (%), which is an index of the high-temperature storage characteristics.

The test results of the cells of Examples 1 to 11 and Comparative Examples 1 to 5 are shown in Table 1 below. In Table 1, the values of the cycle discharge capacity and the high-temperature post-storage capacity return rate are shown with evaluation symbols, which have the following meaning:

In the Column of Cycle Discharge Capacity:
VG (very good): 83% or more
G (good): 76 to 82%
B (bad): 66 to 75%
VB (very bad): 65% or less In the Column of High-Temperature Post-Storage Capacity Return Rate:
  VG (very good): 88% or more
  G (good): 84 to 87%
  B (bad): 83% or less

TABLE 1

|  | solvent composition EC/PC/MEC/DEC (% by volume) | dinitrile compound (% by mass) | 1,3-dioxane (% by mass) | vinylene carbonate (% by mass) | cycle discharge capacity (%) | high-temperature post-storage capacity return rate (%) |
|---|---|---|---|---|---|---|
| Ex. 1 | 30/1/34/35 | AN 1.0 | 1.0 | 2.0 | VG 87 | VG 90 |
| Ex. 2 | 25/1/39/35 | AN 1.0 | 1.0 | 2.0 | VG 84 | VG 91 |
| Ex. 3 | 25/1/39/35 | SN 1.0 | 1.0 | 2.0 | VG 83 | VG 90 |
| Ex. 4 | 30/1/34/35 | AN 0.3 | 1.0 | 2.0 | VG 88 | VG 89 |
| Ex. 5 | 30/1/34/35 | AN 0.1 | 1.0 | 2.0 | G 80 | VG 88 |
| Ex. 6 | 30/1/34/35 | AN 1.0 | 0.3 | 2.0 | VG 84 | VG 90 |
| Ex. 7 | 30/1/34/35 | AN 1.0 | 0.1 | 2.0 | G 82 | VG 88 |
| Ex. 8 | 30/1/34/35 | AN 3.0 | 1.0 | 2.0 | VG 83 | VG 91 |
| Ex. 9 | 30/1/34/35 | AN 4.0 | 1.0 | 2.0 | B 75 | VG 90 |
| Ex. 10 | 30/1/34/35 | AN 1.0 | 3.0 | 2.0 | VG 83 | VG 89 |
| Ex. 11 | 30/1/34/35 | AN 1.0 | 4.0 | 2.0 | B 74 | VG 88 |
| Com. Ex. 1 | 25/1/39/35 | 0 | 1.0 | 2.0 | G 79 | G 84 |
| Com. Ex. 2 | 30/1/34/35 | 0 | 0 | 2.0 | VG 83 | B 67 |
| Com. Ex. 3 | 30/1/34/35 | 0 | 1.0 | 2.0 | G 81 | G 84 |
| Com. Ex. 4 | 30/1/34/35 | AN 1.0 | 0 | 2.0 | G 80 | G 85 |
| Com. Ex. 5 | 20/1/44/35 | AN 1.0 | 1.0 | 2.0 | VB 64 | VG 92 |

In the Column of the Solvent
  EC: ethylene carbonate
  PC: propylene carbonate
  MEC: methyl ethyl carbonate
  DEC: diethyl carbonate
In the Column of the Dinitrile Compound
  AN: adiponitrile
  SN: sebaconitrile In Table 1, all of 11 Examples were VG (very good) in the high-temperature post-storage capacity return rate, seven Examples were VG (very good) in both items: the cycle discharge capacity and the high-temperature post-storage capacity return rate, and two Examples were VG (very good) in one item and G (good) in the other. None of the five Comparative Examples, on the other hand, was either VG (very good) in both items, or VG (very good) in one item and G (good) in the other. These results demonstrate the effect of the additives used in the present invention. The following are comparisons between different conditions of the additives.

The Synergistic Effect Between Dinitrile Compound and 1,3-Dioxane

Comparative Examples 1, 3, and 4 containing either a dinitrile compound or 1,3-dioxane showed low values in both the cycle discharge capacities and the high-temperature post-storage capacity return rate. Comparative Example 2 containing neither a dinitrile compound nor 1,3-dioxane showed a high value in the cycle discharge capacity, but an extremely low value in the high-temperature post-storage capacity return rate. In contrast, Example 1 containing both a dinitrile compound and 1,3-dioxane showed high values in both the high-temperature post-storage capacity return rate and the cycle discharge capacity.

These results are considered to be due to the following reasons. The single addition of a dinitrile compound or dioxane provides the effect of protecting the active material, but at the same time, reduces its activity, providing low cycle characteristics. A concurrent use of a dinitrile compound and dioxane provides strong protection of the active material, without degrading the activity of the active material as much as in the case of using one of them alone. This produces a synergistic effect to improve both the cycle characteristics and the storage characteristics.

The Influence of the Dinitrile Compound Content

Example 5 indicates that when the dinitrile compound content is 0.1% by mass, the cycle discharge capacity is low. Example 9 indicates the dinitrile compound content is 4.0% by mass, the cycle discharge capacity is very low. Therefore, the dinitrile compound content is preferably in the range of 0.3% to 3.0% by mass.

The Influence of the 1,3-Dioxane Content

As apparent from Examples 6, 7, 10, and 11, the 1,3-dioxane content has a similar influence to the dinitrile compound content. Therefore, the 1,3-dioxane content is preferably in the range of 0.3% to 3.0% by mass.

The Influence of the Ethylene Carbonate Content

A comparison between Examples 1, 2 and Comparative Example 5 indicates that changing the ethylene carbonate content from 30% by volume to 25% by volume does not cause major changes, but changing to 20% by volume greatly decreases the cycle discharge capacity. This indicates that the effect of the additives used in the present invention cannot be obtained when the ethylene carbonate content is less than 20% by volume.

The Influence of the Type of a Dinitrile Compound

A comparison between Examples 2 and 3 indicates that replacing adiponitrile by sebaconitrile causes almost no change in the cycle discharge capacity or the high-temperature post-storage capacity return rate, providing excellent values as shown in Table 1. Adiponitrile has four methylene groups, and sebaconitrile has eight methylene groups between two nitrile groups. Their large difference in the chain length indicates that the effect of the dinitrile compound is hardly influenced by its chain length. Therefore, the present invention can use a various kinds of dinitrile compounds without considering the influence of the chain length.

In order to examine the influence of the vinylene carbonate content, the data of Example 1 and 12 to 15 are shown Table 2 below.

TABLE 2

|   | solvent composition EC/PC/MEC/DEC (% by volume) | dinitrile compound (% by mass) | 1,3-dioxane (% by mass) | vinylene carbonate (% by mass) | cycle discharge capacity (%) | high-temperature post-storage capacity return rate (%) |
|---|---|---|---|---|---|---|
| Ex. 1 | 30/1/34/35 | AN 1.0 | 1.0 | 2.0 | VG 87 | VG 90 |
| Ex. 12 | 25/1/39/35 | AN 1.0 | 1.0 | 0.2 | B 71 | VG 88 |
| Ex. 13 | 30/1/34/35 | AN 1.0 | 1.0 | 0.5 | VG 83 | VG 90 |
| Ex. 14 | 30/1/34/35 | AN 1.0 | 1.0 | 3.0 | VG 86 | VG 89 |
| Ex. 15 | 30/1/34/35 | AN 1.0 | 0.3 | 5.0 | VG 90 | B 82 |

In the Column of the Solvent
EC: ethylene carbonate
PC: propylene carbonate
MEC: methyl ethyl carbonate
DEC: diethyl carbonate
In the Column of the Dinitrile Compound
AN: adiponitrile As apparent from Table 2, when the vinylene carbonate content is 0.2% by mass, the cycle discharge capacity is low, and the vinylene carbonate content is 5.0% by mass, the high-temperature post-storage capacity return rate is low. Therefore, the vinylene carbonate content is preferably in the range of 0.5% to 3.0% by mass.

In order to examine the influence of different positive electrode active materials, the test results of Examples 1 and 16 are shown in Table 3 below.

TABLE 3

|   | positive electrode active material | cycle discharge capacity (%) | high-temperature post-storage capacity return rate (%) |
|---|---|---|---|
| Ex. 1 | a Zr—Mg-containing product | VG 87 | VG 90 |
| Ex. 16 | a Ni—Mn—Co-coated product | VG 89 | VG 94 |

Example 16 uses the same non-aqueous electrolyte as Example 1.

Table 3 indicates that both of the two positive electrode active materials provide excellent results in the cycle characteristics and the high-temperature storage characteristics. This demonstrates that the additives used in the present invention are applicable to both positive electrode active materials that are useful for high-voltage charging.

Additions

In Examples 1 to 15 and Comparative Examples 1 to 5, the positive electrode active material is composed of the lithium-cobalt composite oxide containing zirconium and magnesium (the active material "A") and the layered lithium nickel manganese oxide (the active material "B") in a mass ratio of 7:3, but the ratio is not limited to this.

However, in the positive electrode active material composed of the active materials "A" and "B", when the lithium-cobalt composite oxide content is less than 51% by mass, the cell capacity, the cycle characteristics, and the storage characteristics may be low. When the layered lithium nickel manganese oxide content is less than 5% by mass, the positive electrode active material has poor thermal stability at a high voltage. Therefore, the lithium-cobalt composite oxide and the layered lithium nickel manganese oxide are preferably in a mass ratio of 51:49 to 95:5, and more preferably, 70:30 to 90:10.

The lithium-cobalt composite oxide may contain metallic elements other than zirconium and magnesium. The layered lithium nickel manganese oxide may contain metallic elements other than cobalt.

In the secondary cell of the present invention, the components of the non-aqueous electrolyte solvent other than ethylene carbonate are not limited in type. Examples of the components include propylene carbonate, butylene carbonate, dimethyl carbonate, methyl ethyl carbonate, diethyl carbonate, methyl propyl carbonate, methyl butyl carbonate, ethyl propyl carbonate, ethyl butyl carbonate, dipropyl carbonate, fluoroethylene carbonate, 1,2-cyclohexyl carbonate, cyclopentanone, sulfolane, 3-dimethyl sulfolane, 2,4-dimethyl sulfolane, 3-methyl-1,3-oxazolidine-2-one, γ-butyrolactone, γ-valerolactone, γ-dimethoxyethane, tetrahydrofuran, 2-methyltetrahydrofuran, 1,4-dioxane, 1,3-dioxolane, methyl acetate, ethyl acetate, and mixtures thereof.

The electrolyte salt used in the non-aqueous electrolyte of the secondary cell of the present invention is not particularly limited in type. Examples of the electrolyte salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_3)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof.

The negative electrode active material used in the present invention is not limited to graphite, which is used in the Examples 1-16, but may alternatively be a carbon material capable of absorbing and desorbing lithium, or other materials.

The separator used in the present invention can be made from a variety of well-known materials.

The non-aqueous electrolyte secondary cell of the present invention, which is characterized by its non-aqueous electrolyte, is not limited in shape or use: it can be prismatic, cylindrical or coin shaped.

INDUSTRIAL APPLICABILITY

The non-aqueous electrolyte secondary cell of the present invention capable of being charged at high voltage and having excellent cycle characteristics and excellent high-temperature storage characteristics provides high industrial applicability.

What is claimed is:
1. A non-aqueous electrolyte secondary cell comprising:
a positive electrode having an active material capable of inserting and extracting lithium;
a negative electrode having an active material capable of inserting and extracting lithium; and
a non-aqueous electrolyte containing a non-aqueous solvent and an electrolyte salt, the non-aqueous solvent containing ethylene carbonate in the range of 25% to 40% by volume under the conditions of 25° C. and 1 atm, wherein the non-aqueous electrolyte further comprises 1,3-dioxane and a dinitrile compound as additives;

wherein the dinitrile compound content is in the range of 0.3% to 3.0% by mass relative to the total mass of the non-aqueous electrolyte; and wherein the 1,3-dioxane content is in the range of 0.3% to 3.0% by mass relative to the total mass of the non-aqueous electrolyte; and the dinitrile compound is selected from the group consisting of adiponitrile, pimelonitrile and sebaconitrile.

2. The non-aqueous electrolyte secondary cell of claim 1, wherein the non-aqueous electrolyte further contains, as an additive, vinylene carbonate in the range of 0.5% to 3.0% by mass relative to the total mass thereof.

* * * * *